United States Patent
Lombardo et al.

(10) Patent No.: US 12,453,713 B2
(45) Date of Patent: Oct. 28, 2025

(54) LIQUID FORMULATION TO TREAT A CORNEAL TISSUE

(71) Applicant: VISION ENGINEERING ITALY SRL, Rome (IT)

(72) Inventors: Giuseppe Lombardo, Rome (IT); Marco Lombardo, Rome (IT)

(73) Assignee: VISION ENGINEERING ITALY SRL, Rome (IT)

( * ) Notice: Subject to any disclaimer, the term of this patent is extended or adjusted under 35 U.S.C. 154(b) by 988 days.

(21) Appl. No.: 17/618,888

(22) PCT Filed: Jul. 9, 2020

(86) PCT No.: PCT/IB2020/056453
§ 371 (c)(1),
(2) Date: Dec. 14, 2021

(87) PCT Pub. No.: WO2021/009623
PCT Pub. Date: Jan. 21, 2021

(65) Prior Publication Data
US 2023/0131004 A1 Apr. 27, 2023

(30) Foreign Application Priority Data
Jul. 17, 2019 (IT) .................. 102019000011985

(51) Int. Cl.
| | | |
|---|---|---|
| *A61K 31/352* | (2006.01) | |
| *A61K 9/00* | (2006.01) | |
| *A61K 31/525* | (2006.01) | |
| *A61K 41/00* | (2020.01) | |
| *A61P 27/02* | (2006.01) | |

(52) U.S. Cl.
CPC .......... *A61K 31/352* (2013.01); *A61K 9/0048* (2013.01); *A61K 31/525* (2013.01); *A61K 41/0057* (2013.01); *A61P 27/02* (2018.01)

(58) Field of Classification Search
CPC ...... A61K 9/0048; A61K 31/525; A61P 27/04
See application file for complete search history.

(56) References Cited

U.S. PATENT DOCUMENTS

| | | | | |
|---|---|---|---|---|
| 9,192,594 | B2 * | 11/2015 | Troisi .................. | A61K 31/525 |
| 10,350,111 | B2 * | 7/2019 | Friedman ............... | A61F 9/007 |
| 2015/0305930 | A1 | 10/2015 | Myung et al. | |
| 2017/0156926 | A1 | 6/2017 | Friedman et al. | |
| 2018/0236077 | A1 | 8/2018 | Friedman et al. | |

FOREIGN PATENT DOCUMENTS

| | | |
|---|---|---|
| WO | 2012095877 A1 | 7/2012 |
| WO | 2014014521 A1 | 1/2014 |
| WO | 2019131720 A1 | 7/2019 |

OTHER PUBLICATIONS

Ostacolo, C. et al. Enhancement of corneal permeation of riboflavin-5'-phosphate through vitamin E TPGS: A promising approach in trans-epithelial corneal cross-linking treatment, Int J Pharm 440, 2013 148-153) (Year: 2013).*
Marco Lombardo, et al., Interaction of ultraviolet light with the cornea: Clinical implications for corneal crosslinking, J Cataract Refract Surg, 2015, pp. 446-459, vol. 41, Elsevier Inc.
Barbara Pui Chan, Biomedical Applications of Photochemistry, Tissue Engineering: Part B, 2010, pp. 509-522, vol. 16, No. 5.
Mauricio S. Baptista, et al., Type I and Type II Photosensitized Oxidation Reactions: Guidelines and Mechanistic Pathways, Photochemistry and Photobiology, 2017, pp. 912-919, vol. 93.
Gisela K. Oster, et al., Dye-sensitized Photopolymerization of Acrylamide, J Am Chem Soc., 1957, pp. 595-598, vol. 79.
Karen Reiser, et al., Enzymatic and nonenzymatic cross-linking of collagen and elastin, The FASEB Journal, 1992, pp. 2439-2449, vol. 6.
A.Scott Mccall, et al., Mechanisms of Corneal Tissue Cross-linking in Response to Treatment with Topical Riboflavin and Long-Wavelength Ultraviolet Radiation (UVA), Investigative Ophthalmology & Visual Science, 2010, pp. 129-138, vol. 51, No. 1.
Pavel Kamaev, et al., Photochemical Kinetics of Corneal Cross-Linking with Riboflavin, Investigative Ophthalmology & Visual Science, 2012, pp. 2360-2367, vol. 53, No. 4.
Saadettin Sel, et al., UVA irradiation of riboflavin generates oxygen-dependent hydroxyl radicals, Redox Report, 2014, pp. 72-79, vol. 19, No. 2.
Dhananjay Dendukuri, et al., Modeling of Oxygen-Inhibited Free Radical Photopolymerization in a PDMS Microfluidic Device, Macromolecules, 2008, pp. 8547-8556, 41.
Arnauld De La Rochette, et al., Advanced glycation endproducts as UVA photosensitizers of tryptophan and ascorbic acid: consequences for the lens, Biochimica et Biophysica Acta, 2003, pp. 235-241, vol. 1621, Elsevier.

(Continued)

*Primary Examiner* — Gina C Justice
(74) *Attorney, Agent, or Firm* — Bayramoglu Law Offices LLC (57) ABSTRACT

A pharmaceutical composition for an ophthalmic use either in humans or mammalians for a treatment of eye disorders is provided. The pharmaceutical composition includes an effective amount of an oxidizing agent and an effective amount of a photo-sensitizing agent, in combination with pharmaceutically acceptable excipients; the photo-sensitizing agent is a molecule having an absorbance peak in a wavelength range between 340 nm and 440 nm and emits fluorescence in a wavelength range between 450 nm and 600 nm; the oxidizing agent is chosen among molecules, wherein the molecules partially or totally inhibit a mitochondrial electron transport chain activity, wherein the pharmaceutical composition is a liquid formulation further includes one or more substances chosen among: diluents, permeabilizers, disinfectants, buffer systems, salts, antiseptics, and the pharmaceutically acceptable excipients.

15 Claims, 4 Drawing Sheets

(56) References Cited

OTHER PUBLICATIONS

Markus Kohlhaas, et al., Biomechanical evidence of the distribution of cross-links in corneas treated with riboflavin and ultraviolet A light, J Cataract Refract Surg, 2006, pp. 279-283, vol. 32.

Janice Dias, et al., Anterior and posterior corneal stroma elasticity after corneal collagen crosslinking treatment, Experimental Eye Research, 2013, pp. 58-62, 116.

Giuliano Scarcelli, et al., Brillouin Microscopy of Collagen Crosslinking: Noncontact Depth-Dependent Analysis of Corneal Elastic Modulus, Investigative Ophthalmology & Visual Science, 2013, pp. 1418-1425, vol. 54, No. 2.

Marco Lombardo, et al., Translational label-free nonlinear imaging biomarkers to classify the human corneal microstructure, Biomedical Optics Express, 2015, pp. 2803-2818, vol. 6. No. 8.

I. Fatt, et al., Oxygen Tension Distributions in the Cornea: A Re-examination, Exp Eye Res, 1974, pp. 357-365, vol. 18.

Runyu Guo, et al., Structure and mechanism of mitochondrial electron transport chain, Biomedical Journal, 2018, pp. 9-20, vol. 41.

Thomas P. Singer, Mitochondrial Electron-Transport Inhibitors, Methods in Enzymology, 1979, pp. 454-462, vol. 55.

Jakub Rohlena, et al., Anticancer Drugs Targeting the Mitochondrial Electron Transport Chain, Antioxidants & Redox Signaling, 2011, pp. 2951-2974, vol. 15, No. 12.

Drew J. Adams, et al., Discovery of Small-Molecule Enhancers of Reactive Oxygen Species That are Nontoxic or Cause Genotype-Selective Cell Death, ACS Chemical Biology, 2013, pp. 923-929, vol. 8, American Chemical Society.

Rita Mencucci MD, et al., Effects of riboflavin/UVA corneal cross-linking on keratocytes and collagen fibres in human cornea, Clinical and Experimental Ophthalmology, 2010, pp. 49-56, vol. 38.

Alexander Müller, et al., Photodynamic inactivation of *Escherichia coli*—Correlation of singlet oxygen kinetics and phototoxicity, Journal of Photochemistry & Photobiology, B: Biology, 2018, pp. 219-227, vol. 178.

Xavier Ragàs, et al., Singlet Oxygen in Antimicrobial Photodynamic Therapy: Photosensitizer-Dependent Production and Decay in *E. coli*, Molecules, 2013, pp. 2712-2725, vol. 18.

Anders P. Sondergaard, et al., Corneal Distribution of Riboflavin Prior to Collagen Cross-Linking, Current Eye Research, 2010, pp. 116-121, vol. 35, No. 2.

Eberhard Spoerl, et al., Correlation Between UV Absorption and Riboflavin Concentration in Different Depths of the Cornea in CXL, Current Eye Research, 2010, pp. 1040-1041, vol. 35, No. 11.

Michael J. Akers, Formulation and Stability of Solutions, International Journal of Pharmaceutical Compounding, 2016, pp. 137-141, vol. 20, No. 2.

Douglas V. Frost, The Water-Soluble Riboflavin-Boron Complex, 1942, pp. 693-700.

Anja Kissner, et al., Pharmacological modification of the epithelial permeability by benzalkonium chloride in UVA/Riboflavin corneal collagen cross-linking, Curr Eye Res, 2010, pp. 715-721, vol. 35, No. 8.

Stefano Baiocchi, et al., Corneal crosslinking: Riboflavin concentration in corneal stroma exposed with and without epithelium, J Cataract Refract Surg, 2009, pp. 893-899, vol. 35.

Jose M. Larrosa, et al., Antiproliferative effect of intravitreal α-tocopherol and α-tocopheryl-acid-succinate in a rabbit model of PVR, Current Eye Research, 1997, pp. 1030-1035, Oxford University Press.

Rania S. Sulaiman, et al., Natural product inhibitors of ocular angiogenesis, Experimental Eye Research, 2014, pp. 161-171, vol. 129.

Florian Nagel, et al., Tyrosine hydroxylase-positive amacrine interneurons in the mouse retina are resistant against the application of various parkinsonian toxins, Brain Research Bulletin, 2009, pp. 303-309, vol. 79, No. 5.

Christophe Lechauve, et al., Neuroglobin involvement in respiratory chain function and retinal ganglion cell integrity, Biochimica et Biophysica Acta, 2012, pp. 2261-2273, vol. 1823, No. 12.

Fabrice D. Heitz, et al., Idebenone Protects against Retinal Damage and Loss of Vision in a Mouse Model of Leber's Hereditary Optic Neuropathy, PLOS One, 2012, pp. 1-11, vol. 7, No. 9, E45182.

Xian Zhang, et al., Methylene Blue Prevents Neurodegeneration Caused by Rotenone in the Retina, Neurotoxicity Research, 2006, pp. 47-57, vol. 9, No. 1.

Brigitte Pech, et al., Preliminary Evaluation of a Series of Amphiphilic Timolol Prodrugs: Possible Evidence for Transscleral Absorption, Journal of Ocular Pharmacology, 1993, pp. 141-150, vol. 9, No. 2.

Son B. Le, et al., Inhibition of Mitochondrial Respiration as a Source of Adaphostin-induced Reactive Oxygen Species and Cytotoxicity, The Journal of Biological Chemistry, 2007, pp. 8860-8872, vol. 282, No. 12.

\* cited by examiner

LIQUID FORMULATION TO TREAT A CORNEAL TISSUE

CROSS REFERENCE TO THE RELATED APPLICATIONS

This application is the national stage entry of International Application No. PCT/IB2020/056453, filed on Jul. 9, 2020, which is based upon and claims priority to Italian Patent Application No. 102019000011985 filed on Jul. 17, 2019, the entire contents of which are incorporated herein by reference.

TECHNICAL FIELD

The present invention relates to a liquid formulation to perform a treatment of the corneal tissue.

BACKGROUND

In the last years, the "corneal cross-linking" treatment has been increasingly used in clinic. A drug is administered onto the corneal tissue, which, subsequently subject to UV-A irradiation, improves the tissue mechanical strengthening. This method is widely used for the treatment of keratoconus or iatrogenic corneal ectasia [Lombardo M et al. J Cataract Refract Surg 2015; 41 (2): 446-459], and more recently for the treatment of corneal infections and for the correction of visual disorders, such as myopia or presbyopia.

Corneal cross-linking consists of two consecutive phases: a first phase in which an operator applies a liquid formulation, essentially consisting of a photo-sensitizing, or cross-linking agent, preferably riboflavin, and a second phase of photo-activation of said agent by means of an ultraviolet light source (UV-A). The photo-chemical mechanism underlying the therapeutic effect of corneal cross-linking is the generation of new covalent chemical bonds ("cross-linking bonds") between the stromal proteins (collagen and proteoglycan core proteins) through intermediate reagents, such as singlet oxygen. Said mechanism for generating new covalent chemical bonds is also known by a person skilled in the art as "polymerization" [Lombardo M et al. J Cataract Refract Surg 2015; 41 (2): 446-459].

The clinical efficacy of corneal cross-linking is highly variable, and this variability is mainly related to the penetration of the cross-linking agent into the corneal stroma and the greater or lesser generation of said new covalent chemical bonds between stromal proteins through Type I and Type II photochemical reactions. The prior art documents [Pui Chan B. Tissue Engineering: Part B. 2010; 16:509-522; Baptista M S et al. Photochemistry and Photobiology 2017; 93:912-919] describe exhaustively the Type I and Type II photo-chemical reactions. Both said photochemical reactions take place in the presence of oxygen and give rise to the formation of intermediate reagents, or transient unstable reactive species, such as reactive oxygen species ("ROS"), for example superoxide anion ($^3O_2^-$ or (2), hydrogen peroxide ($H_2O_2$) and hydroxyl radicals (·OH) via Type I reactions and singlet oxygen ($^1O_2$ or *O2) via Type II reactions. In the case of corneal cross-linking treatment, the Type I photochemical mechanism is favoured at high concentrations of the photo-sensitizing agent, such as riboflavin, into the stromal matrix, as for example at the beginning of the photo-activation phase of said photo-sensitizing or cross-linking agent and/or by reduced oxygen concentration; conversely, the Type II photochemical mechanism is mainly favoured by the presence of oxygen into the corneal stroma [Oster G K. J Am Chem Soc 1957, 79: 595-598; Reiser K. FASEB J 1992; 6:2439-2449; McCall A S. et al. Invest Ophthalmol Vis Sci 2010; 51:129-138].

In Type I photochemical mechanism, the excited state of the photo-sensitizing agent, the excited triplet of riboflavin (Rf*3), reacts with the components of the corneal stroma to generate superoxide ions by hydrogen atoms or electrons transfer to generate the ribitol riboflavin radical. Conversely, in Type II photochemical mechanism, the excited triplet state of riboflavin reacts with oxygen to produce singlet oxygen, $^1O_2$ [Kamaev P. et al. Invest Ophthalmol Vis Sci 2012; 53:2360-2367; Sel S. Redox Rep 2014; 19:72-79]. In general, the quantity and distribution of singlet oxygen that is generated in said Type II photochemical reaction is correlated with the concentration of riboflavin, the presence and concentration of oxygen.

Reactive oxygen species (ROS) are intermediate metabolic products of aerobic cellular respiration. Singlet oxygen, $^1O_2$, is a ROS. There are different methods for generating singlet oxygen; photodynamic therapy is one of the known methods: this process consists of transferring energy between a photo-sensitizing agent and oxygen, the oxygen having previously been administered in the gaseous phase, either by the same oxygen present in the air or by a source of pure or mixed oxygen. Singlet oxygen, $^1O_2$, can be generated by irradiating a photo-sensitizing agent with an appropriate electromagnetic wavelength. For example, in the case of corneal cross-linking, by irradiating riboflavin with UV-A light, the excited state ($Rf^*_3$) is formed, subsequently, the excited state transfers part of its energy to oxygen, present in its fundamental state during the reaction, and thus singlet oxygen, $^1O_2$, is generated. For example, documents US20180236077 and US20170156926 describe means and methods for administering gaseous $O_2$ simultaneously with the administration of a photo-sensitizing agent for improving the corneal cross-linking treatment. In document WO2014014521, in addition to the administration of gaseous Oz, is described the opportunity of adding oxidizing agents to a liquid formulation of riboflavin for corneal cross-linking.

By contrast, it has been well established [Dendukuri D et al. Macromolecules 2008; 41:8547-8556; De La Rochette A et al. Biochim Biophys Acta 2003; 1621:235-241; Kamaev P et al. Invest Ophthalmol Vis Sci 2012; 53 (4): 2360-2367] that an excessive concentration of oxygen opposes the propagation of the chain reaction of Type I mechanism, even in the presence of a high concentration of riboflavin, and can also have a destructive effect on corneal proteins, in particular on the cross-linking bonds between proteins, due to further reactions induced by superoxide anion ($O_2^-$), hydrogen peroxide ($H_2O_2$) or hydroxyl radicals (·OH). In other words, the excessive presence of oxygen can limit the effect of polymerization and therefore the mechanical stiffening of the cornea. It is, therefore, clear that the two polymerization reactions for generating new covalent chemical bonds are in competition and for this reason they can limit the overall tissue biomechanical stiffening effect of the cornea being treated by corneal cross-linking. Therefore, the person skilled in the art would certainly avoid introducing an oxidizing agent to encourage the generation of Type I bonds.

The state of the art of the corneal cross-linking treatment denotes that the biomechanical stiffening is greater across the anterior, or more external, stromal layers of the cornea than the posterior, or deeper, stromal layers [Kohlhaas M et al. J Cataract Refract Surg 2006; 32:279-283; Dias J et al. Exp Eye Res 2013, 116:58-62; Scarcelli G et al. Invest Ophthalmol Vis Sci 2013; 54:1418-1425]. The overall effect is that there is limited clinical efficacy of the cross-linking treatment, because the new covalent chemical bonds are mostly generated across the most anterior stromal layers than across the deeper stromal layers. In other words, the clinical efficacy of corneal cross-linking is limited to the anterior, or external, stromal layers.

If not specifically excluded in the detailed description that follows, what is described in this chapter is to be considered as an integral part of the detailed description.

SUMMARY

The purpose of the present invention is to disclose a method to favour the generation of cross-linking bonds through Type II reactions without inhibiting Type I reactions, mainly by directly increasing the singlet oxygen concentration in the corneal stroma.

A scope of the present invention is to enhance the formation of new, or additional, covalent chemical bonds mainly in the posterior, or deeper, stromal layers of the cornea.

The present invention discloses a liquid formulation consisting of a photo-sensitizing agent including an oxidizing agent.

This purpose originates from the fact that it has been found that the oxidizing agent promotes the formation of Type II bonds, while not limiting/contrasting the formation of Type I bonds.

In the context of the present description, "cross-linking agent" and "photo-sensitizing agent" are used as synonyms. In addition, for convenience, the molecules that are members of the family of the mitochondrial electron transport chain inhibitors are simply called "mETC inhibitors" or "oxidizing agent".

Within the scope of this description, according to the state of art documents (Lombardo M. et al. Biomed Opt Express 2015; 8; 6 (8): 2803-2818], the terms:

"anterior" stroma indicates the external layers of the corneal tissue, which are between 0 and 250 micrometers thickness with respect to the external corneal surface;

"posterior" or "deep" or "deeper" stroma indicates the layers of the corneal tissue which are placed at a depth deeper than 250 micrometers with respect to the external corneal surface.

The combined action of the oxidizing agent and the photo-sensitizing agent synergistically improves Type II reactions in the corneal stroma during corneal cross-linking treatment of ocular disorders by improving the polymerization mechanism of corneal proteins, i.e., the generation of new cross-linking bonds between stromal proteins, mainly across the posterior stromal layers, while not preventing the formation of Type I bonds.

The document WO2014014521 does not describe any method or device able of increasing the concentration of singlet oxygen and/or the number of covalent chemical, or cross-linking, bonds directly within the corneal tissue and especially in the posterior, deeper, layers of the corneal stroma, in other words favoring the formation of Type II bonds.

In other words, according to the present invention, singlet oxygen is supplied without passing through gaseous oxygen and its relative adsorption, or is generated directly inside the corneal tissue, without going through photo-chemical reactions induced by the activation of the photo-sensitizing agent, which involve said gaseous oxygen, since it is administered in liquid form, i.e., by means of the composition of the present invention. In addition, the oxidizing agent included in the liquid formulation penetrates into the deeper layers of the corneal stroma, promoting cross-linking even in these stromal layers with a far more satisfactory result than the known technique.

Actually, the opportunity of treating the posterior, or deeper, stromal layers allows for a more homogeneous biomechanical stiffening of the cornea across its depth and its anisotropic structural characteristics.

The formulation object of the present invention finds application in ophthalmology in general and in particular for the treatment of keratoconus and corneal ectasia, for the treatment of corneal infections, and for the correction of visual disorders, such as myopia, hyperopia, astigmatism and presbyopia.

Thanks to the present invention, it is not necessary to control the atmosphere in contact with the cornea and in particular, the administration of gaseous oxygen, which requires the use of complex devices and whose diffusion within the corneal tissue is variable and severely reduced in the posterior stromal layers, is not necessary [Fatt I et al. Exp Eye Res 1974; 18:357-365].

Advantageously, unlike the known methods that increase the oxygen levels at the corneal surface, the present invention allows for the increase of singlet oxygen directly in the corneal stroma favouring Type II reactions and thus the cross-linking of said stromal layers.

Advantageously, the method described herein can be also applied onto excised corneal tissues, which have been harvested from a cadaver eye in an eye bank, before a subsequent graft.

According to a preferred embodiment of the present invention, the pharmaceutical formulation comprises an oxidizing substance and a photo-sensitizing substance, in combination with pharmaceutically acceptable excipients. The formulation is in liquid form and further comprises one or more diluting substances and/or buffering substances and/or permeabilizers and/or disinfectants and/or excipients.

The photo-sensitizing substance can be, by way of non-limiting example, one between riboflavin, fluorescein, coumarin, rose bengal, acridine yellow, quinidine yellow, either individually or in a mixture.

The oxidizing substance can be one of the molecules of the family of the mitochondrial electron transport chain inhibitors, indicated for simplicity as mETC inhibitor(s) or MECI, which is acronym of "Mitochondrial Electron Complex Inhibitor", which by way of non-limiting example can be one of BRD56491 (CAS No: 14756-26-4), BRD5459 (CAS No.: 612037-58-8), and BRD9092 (CAS No.: 330662-92-5), either individually or in a mixture. It is worth noting that the oxygen eventually adsorbed in a liquid compound does not define an oxidizing agent of the family of the mitochondrial electron transport chain inhibitors.

In addition, the formulation can include permeabilizers to facilitate the penetration of the same formulation into the corneal stroma through the intact epithelium. Furthermore, it may include, by way of example, buffer systems, salts, antiseptic agents, disinfectant agents, and pharmaceutically acceptable excipients.

Advantageously, since the formulation is entirely in the liquid state, it can be induced to penetrate into the corneal tissue by exploiting known techniques, such as iontophoresis as described in WO201295877, or vacuum as described in US2015305930.

In both cases, it is not necessary to control the atmosphere in contact with the cornea, contrary to what has been described in US20180236077.

It has also been observed that thanks to the administration of an oxidizing agent within the composition of the present invention and with the characteristics described above, there is no competition against the formation of Type I bonds, as described in [Dendukuri D et al. Macromolecules 2008:41: 8547-8556; De La Rochette A et al. Biochim Biophys Acta 2003; 1621:235-241; Kamaev P et al. Invest Ophthalmol Vis Sci 2012; 53 (4): 2360-2367]. Therefore, in the overall calculation of the number of covalent bonds, including those of Type I and II, these result in an extremely greater number than when only the photosensitizing agent in an oxygen enriched atmosphere is used, as described in WO2014014521.

According to another embodiment of the present invention, a composition is proposed for use in the prevention and treatment of ocular infections, both in humans and in mammalians, comprising an effective amount of the oxidizing agent, in combination with pharmaceutically acceptable excipients, where the oxidizing agent is chosen among the molecules that partially and/or totally inhibit the mitochondrial electron transport chain activity, and in particular the oxidizing agent is the only active ingredient of the composition. The claims describe preferred embodiments of the invention, forming an integral part of this description.

BRIEF DESCRIPTION OF THE DRAWINGS

Further objects and advantages of the present invention will become clear from the detailed description that follows of an example of embodiment (and its variants) and the attached drawings, which are disclosed purely for explanatory and non-limiting purposes, in which:

FIG. 1 describes the mechanism of action of the mitochondrial respiratory chain complex ($C_1$, $C_2$, $C_3$ e $C_4$) in a cell of the corneal stroma, while

The same numbers and the same reference letters in the figures identify the same elements or components.

In the context of this description, the term "second" component does not imply the presence of a "first" component. These terms are in fact used as labels to improve clarity and are not intended to be limited.

The elements and characteristics illustrated in the various preferred embodiments, including the drawings, can be combined with each other without, however, leaving the scope of the protection of the present application, as described below.

DETAILED DESCRIPTION OF THE EMBODIMENTS

The formulation according to the present invention is a liquid composition, which comprises a photo-sensitizing agent and an oxidizing agent.

The photo-sensitizing agent is a molecule that has an absorbance peak in the wavelength range between 340 nm and 440 nm and emits fluorescence in the wavelength range between 450 nm and 600 nm.

The oxidizing agent is chosen among the oxidizing molecules that increase the singlet oxygen concentration by partially and/or totally inhibiting the function of the mitochondrial electron transport chain complexes. There are four complexes in the mitochondrial electron transport chain, as follows:

$C_1$: complex 1—called NADH dehydrogenase or also Coenzyme Q reductase.
$C_2$: complex 2—called succinate dehydrogenase.
$C_3$: complex 3—called cytochrome complex bc1 or also Cytochrome c reductase.
$C_4$: complex 4—called Cytochrome c oxidase.

These complexes are known and for example described in a systematic review of the scientific literature in the field [Guo R. et al. Biomed J 2018; 41:9-20].

Figure 1:
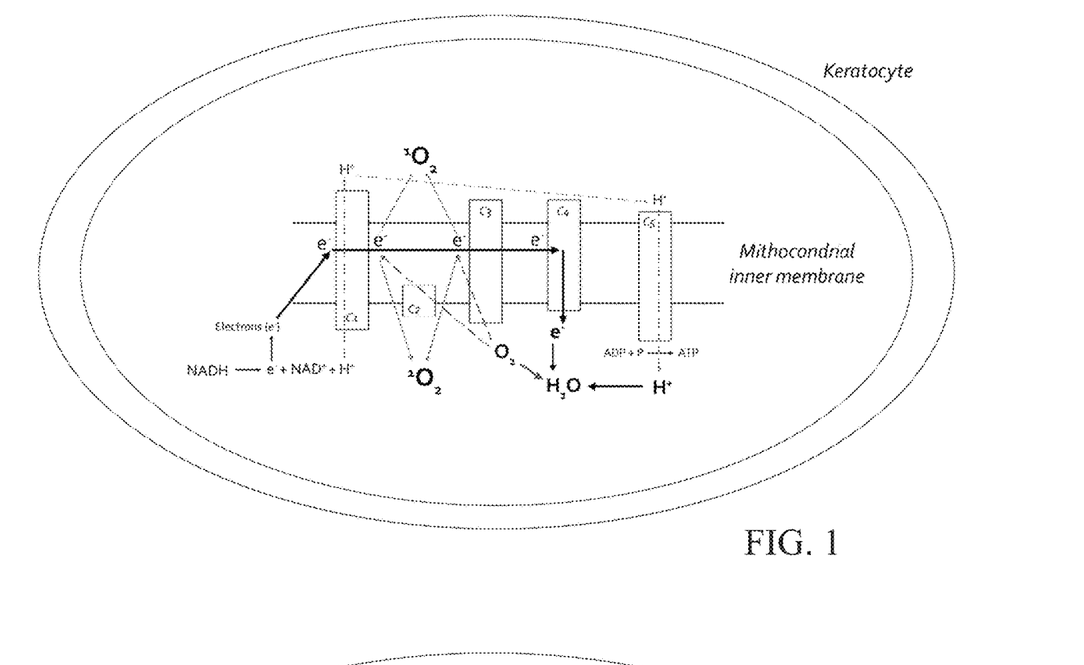

During aerobic respiration, the oxygen within the cells is converted into water and carbon dioxide to produce energy in the form of adenosine triphosphate (ATP) by the mitochondrial respiratory chain complex and the enzyme called ATP synthase ($C_5$) (FIG. 1).

Oxygen is the last electron acceptor in the mitochondrial respiratory chain. By significantly reducing or blocking the activity of the mitochondrial respiratory chain complexes, an increase in singlet oxygen levels, exceeding its physiological levels, is directly induced, taking into account that less than 4% of cellular oxygen generates ROS, mainly singlet oxygen, under physiological conditions.

Figure 2:
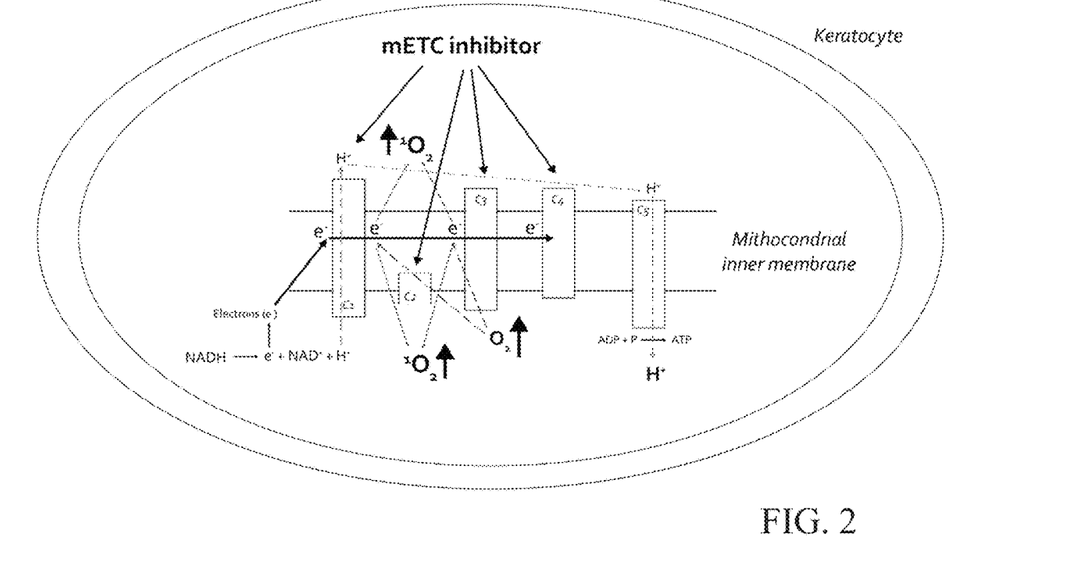
FIG. 2 shows the mechanism of action of the mitochondrial respiratory chain complex in the presence of a formulation that contains an oxidizing agent chosen from the family of mETC inhibitor(s), which increases the levels of singlet oxygen ($^1O_2$) in the cornea of an eye.

The agents that inhibit the mitochondrial electron transport chain, indicated in the scientific literature with the term "mETC inhibitors", are known to a person skilled in the art and described in documents [Singer T P. Methods in Enzymology 1979; 55:454-62; Rohlena J et al. Antioxidants & Redox Signaling 2011; 15:2951-2974; Adams D J et al. ACS Chemical Biology 2013; 8:923-929]. Said agents are used exclusively for their oxidizing action in the treatment of cancer. It has never been described in the scientific literature nor has their role been used in the field of ophthalmology for the prevention and/or treatment of corneal disorders. FIG. 2 exemplifies the action of an oxidizing agent, chosen among one of the low molecular weight molecules of the mETC inhibitors family, such as BRD5459 (CAS No.: 612037-58-8), BRD56491 (CAS No.: 14756-26-4) and BRD9092 (CAS No: 330662-92-5), which inhibits, i.e., decreases or blocks the activity of one or more of the lipo-protein complexes of the mitochondrial electron transport chain (shown in FIG. 2 as $C_1$, $C_2$, $C_3$, and $C_4$).

The molecule BRD56491 [2-(4-methylphenyl)-4H-benzo[h]cromen-4-one], which has a molecular weight of approximately 286 Da, is an inhibitor of the mitochondrial electron transport chain [Adams D J et al. ACS Chem Biol 2013; 8:923-929]. Said oxidizing agent has a direct action in increasing the levels of singlet oxygen, $^1O_2$. The mitochondrial electron transport chain consists of a complex of proteins embedded in the internal lipid membrane of the mitochondria, whose function is to participate in the cascade of oxidation-reduction reactions that follow the Krebs cycle for the generation of ATP (adenosine triphosphate) through the oxidative phosphorylation process mediated by the ATP synthase enzyme ($C_5$). Therefore, through the presence of the oxidizing agent, it is possible to inhibit the activity of the mitochondrial electron transport chain complex by reducing or blocking the oxidative phosphorylation process and the process of reducing oxygen to water. Said inhibition and/or reduction of the mitochondrial electron transport chain complex activity allows to increase the quantity of the intermediate reagents, including singlet oxygen, $^1O_2$ (FIG. 2).

It is therefore clear that the direct generation of singlet oxygen within the corneal stroma, through said oxidizing agent, solves the known limits of the corneal cross-linking technique, by generating additional oxygen singlets directly into the corneal stroma. Specifically, the inhibition or reduction of the mitochondrial electron transport chain complex activity promotes the reaction of oxygen with electrons to generated singlet oxygen rather than the reaction of oxygen with protons to generate water.

It becomes clear that, by using a formulation containing a photo-sensitizing agent and said oxidizing agent of the mETC inhibitors family, it is possible, during the corneal cross-linking treatment, to generate a greater number of covalent chemical bonds across the deeper stromal layers through the direct generation of singlet oxygen by said oxidizing agent.

There is a minimum concentration of said oxidizing agent, preferably BRD56491, or minimum threshold, in the corneal stroma beyond which the concentration of singlet oxygen increases significantly. This threshold, $C_{th1}$, is 3 µmol/l, or 0.9 µg/ml, preferably 2 µmol/l, or 0.6 µg/ml. The generation of singlet oxygen in the cornea is significantly greater than in a corneal tissue in which said oxidizing agent (preferably BRD56491) is absent or in concentrations significantly lower than $C_{th1}$, preferably 3 µmol/l. At concentrations of said oxidizing agent (preferably BRD56491) equal to or greater than $C_{th1}$, preferably 3 µmol/l, in the cornea of an eye, the increase in the generation of singlet oxygen levels is greater than 10%, preferably ≥30%, compared to a corneal tissue devoid of said oxidizing agent. There is a second threshold, $C_{th2}$, 15 µmol/l, or 4.5 µg/ml such that there is an increase in singlet oxygen levels greater than 70%, preferably greater than 90%, with respect to a corneal tissue devoid of said oxidizing agent, preferably BRD56491 In any case, these concentration thresholds of the oxidizing agent are defined such as to maintain the incremental levels of intra-cellular singlet oxygen levels below a safety threshold, i.e., non-toxic to cells. Since the diffusion of singlet oxygen is due to the difference in concentration through the cell membranes, the singlet oxygen spreads very quickly in the extra-cellular matrix where its levels increase and thus improve the Type II reaction for the generation of new covalent chemical bonds between stromal proteins during corneal cross-linking treatment.

The concentration of the oxidizing agent in the liquid formulation can vary, as non-limiting example, between 0.1 µg/ml and 100 g/ml; the greater the concentration of the oxidizing agent in the formulation, the greater the dose of agent that penetrates into the corneal stroma in a given time, especially when the corneal epithelium is left intact. Within said concentration thresholds, $C_{th1}$ and $C_{th2}$, the intracellular activity of the oxidizing agent induces an increase in the singlet oxygen concentration which, in turn, enhances the number of Type II reactions into the corneal tissue when treated with said corneal cross-linking formulation, containing a photo-sensitizing agent and said oxidizing agent. As a result, the new/additional covalent chemical bonds that are formed between the stromal proteins are related to said increase in the number of Type II reactions. The Type II mechanism, without interfering with the Type I photochemical reactions, increases the total number of new, or additional, cross-linking bonds in the corneal stroma compared to a cross-linking formulation, which does not comprises said oxidizing agent.

It should be emphasized that the opportunity of the oxidizing agent to exert its effect across the deeper, or posterior, corneal layers allows for a more homogeneous and gradual biomechanical strengthening, or stiffening, of the corneal tissue according to its thickness and microstructural anisotropic characteristics, thus improving advantageously the cross-linking effect in a more physiological way to the whole corneal thickness.

In relation to any agent eventually present in the formulation that can promote easier penetration of the oxidizing agent into the corneal tissue, the concentration of the oxidizing agent in the formulation may vary with respect to what described above.

For example, it has been found that hypotonicity further promotes the penetration of said oxidizing agent and it is therefore possible to reduce its concentration in said liquid formulation object of the present invention, in order to reach said safe concentration range of the oxidizing agent in the corneal stroma.

A similar result can be obtained from a formulation that contains a molecule similar to BRD56491 or any other molecule of the mETC inhibitors family, which is non-toxic to humans or mammalians. A non-exhaustive and non-limiting description of these agents is present in documents [Singer T P. Methods in Enzymology 1979; 55:454-62; Rohlena J et al. Antioxidants & Redox Signaling 2011; 15:2951-2974; Adams D J et al. ACS Chemical Biology 2013, 8, 923-929]. By way of non-limiting example, among the mETC inhibitors family are the following molecules: adaphostin (CAS Number: 241127-58-2), alpha-tocopherol succinate (CAS No.: 4345-03-3), amobarbital (CAS No.: 57-43-2), antimycin A (CAS No.: 1397-94-0), atpenin A5 (CAS No.: 119509-24-9), benzyl isothiocyanate (CAS No.: 622-78-6), carboxine (CAS No.: 5234-68-4), cyantraniliprole (CAS No.: 736994-63-1), deguelin (CAS No: 522-17-8), doxorubicin (CAS No.: 25316-40-9), fenretinide (CAS No.: 65646-68-6), HQNO (CAS No.: 341-88-8), IACS-010759 (CAS No: 1570496-34-2), lamellarin D (CAS No.: 97614-65-8), malonate (CAS No.: 141-82-2), metformin (CAS No.: 657-24-9), MPP+ (CAS No: 39794-99-5), MK-077 (CAS No.: 147366-41-4), nitric oxide (CAS No.: 10102-43-9), nitropropionic acid (CAS No.: 504-88-1), N-retinylidene-N-retinylethanolamine (CAS No.: 147427-87-0), oligomycin (CAS No.: 1404-19-9), phenformin hydrochloride (CAS No.: 834-28-6), piceatannol (CAS No.: 10083-24-6), piericidin A (CAS No.: 2738-64-9), PM031379, porfimer sodium (CAS No.: 87806-31-3), resveratrol (CAS No.: 501-36-0), rhein (CAS No.: 478-43-3), rhodamine 123 (CAS No.: 62669-70-9), rotenone (CAS No.: 83-79-4), sodium azide (CAS No.: 26628-22-8), tamoxifen (CAS No.: 10540-29-1), TTFA (CAS No.: 326-91-0), 3BP (CAS No.: 1113-59-3), 3-ter-butylated-4-hydroxyanisole (CAS No.: 121-00-6), DIM (CAS No.: 1968 May 4), troglitazon (CAS No.: 97322-87-7), VLX600 (CAS No.: 327031-55-0), xanthomumol (CAS No.: 6754-58-1), BRD56491 (CAS No: 14756-26-4), BRD5459 (CAS No.: 612037-58-8), and BRD9092 (CAS No.: 330662-92-5), in general comprising each of the mETC inhibitors at concentrations ranging between 0.1 µg/ml and 1 µg/ml at the tissue site of action, and in particular for the non-toxic low molecular weight agents, such as BRD56491, BRD5459 and BRD9092, in concentrations ranging from 0.1 µg/ml to 15 µg/ml in the corneal stroma.

The interaction of each of the present molecules with one or more of the mitochondrial electron transport lipoprotein complexes strongly reduces or blocks the flow of electrons without destroying their components.

It is clear that these molecules of the mETC inhibitors family, in particular the low molecular weight agents BRD5459, BRD56491 and BRD9092, are favoured, for their safety and their synergistic behaviour with other drugs or therapeutic techniques, for the treatment of diseases of the human body and in particular of eye disorders.

Another advantage of said liquid formulation, comprising a photo-sensitizing agent and said oxidizing agent, for the treatment of corneal cross-linking, is that the direct generation of ROS, mainly singlet oxygen, within the corneal stroma favours the activation of keratocytes apoptosis and consequently the repopulation of corneal stroma with new keratocytes that synthetize collagen with better biomechanical characteristics. It is known to a person skilled in the art that after the corneal cross-linking treatment, the stromal repopulation is associated with a production of thicker collagen fibers than untreated corneal tissues [Mencucci R et al. Clin Exp Ophthalmol 2010; 38:49-56] and that this effect occurs only in the presence of singlet oxygen generated during corneal cross-linking treatment [McCall A C et al. Invest Ophthalmol Vis Sci 2010; 51: 129-138].

Another advantage of said formulation is that the generation of ROS, preferably singlet oxygen, in the corneal stromal matrix, increases the resistance to microbial infections thanks to the lipid peroxidation action of singlet oxygen on the cell membranes of bacteria, both Gram− and Gram+ that are resistant or not to antibiotics, fungi, protozoa, parasites and viruses [Muller A et al. J Photochem Photobiol B 2018; 178:219-227; Ragas X et al. Molecules 2013; 18; 2712-2725]. Therefore, a formulation with oxidizing agent and photo-sensitizing agent for corneal cross-linking has a synergistic effect to increase oxidative damage against microbes that infect corneal tissue, either in humans or in mammalians. A formulation with only oxidizing agent has a direct damaging effect, without the need for photo-activation, on the cell walls of the micro-organisms that infect the cornea of an eye.

Figure 3:
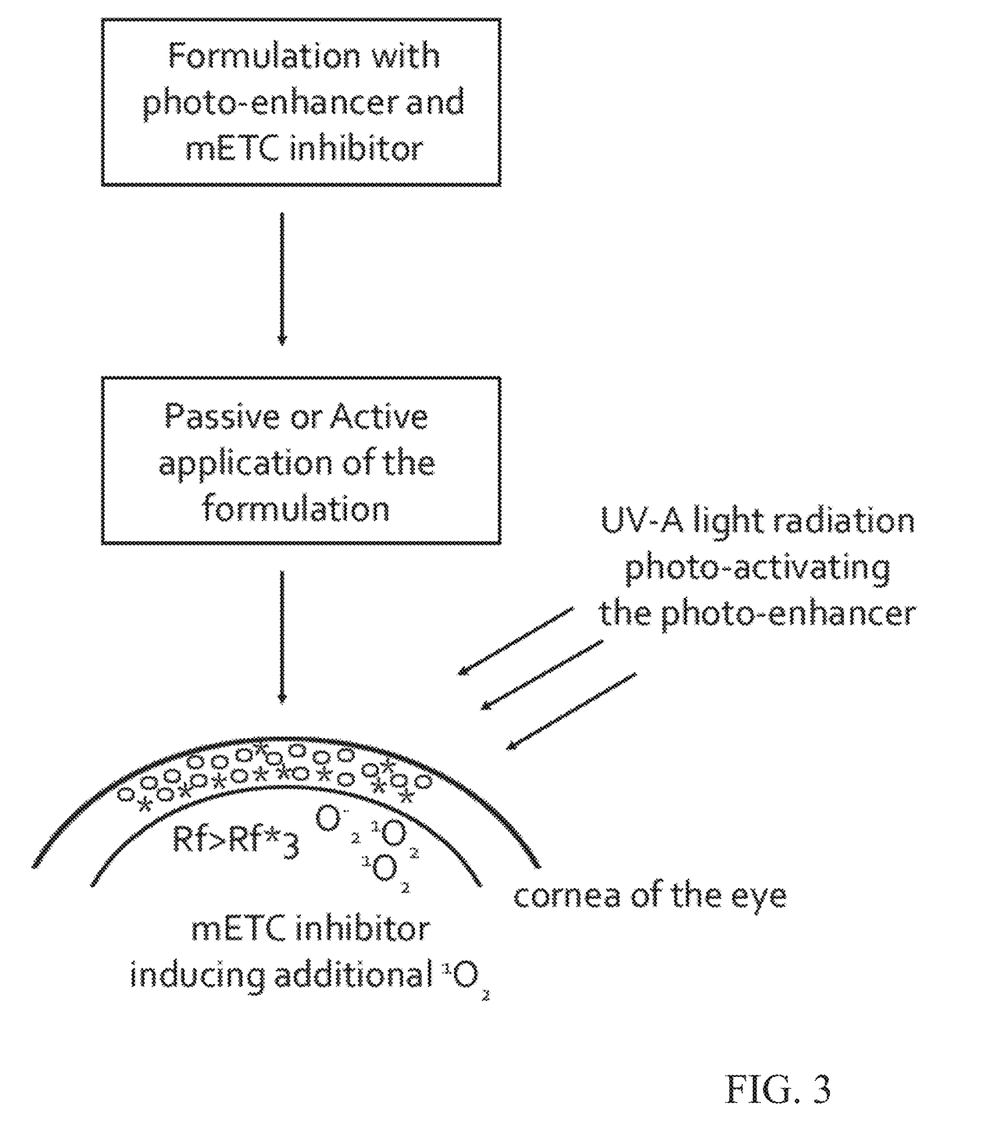
FIG. 3 schematically shows the administration, either passive or active, of the formulation object of the present invention and the subsequent photo-activation of the formulation in order to generate the excited state of the photo-sensitizing agent and subsequent reactive oxygen species through Type I reactions. In parallel, thanks to said oxidizing agent, additional reactive oxygen species, in particular singlet oxygen ($^1O_2$), are directly generated into the corneal stroma.

FIG. 3 schematically illustrates a process of administration, by passive or preferably active methods, of a formulation for the corneal cross-linking treatment, as described in any of the previous embodiments.

The phosphorylated salt of riboflavin (riboflavin-5-phosphate), with a molecular weight of about 470 Da, could be one of the photo-sensitizing agents of the formulation. The concentration of the cross-linking agent in the formulation can vary, by way of example, between 0.01 mg/ml (0.01% m/v) and 5.0 mg/ml (0.5% m/v), preferably between 0.01 mg/ml (0.01% m/v) and 3.5 mg/ml (0.35% m/v); the higher the concentration of the cross-linking agent in the formulation, the higher the dose of agent that penetrates into the corneal stroma in a given time, particularly if the epithelium is intact [Søndergaard A P et al. Curr Eye Res 2010; 35:116-121; Spoerl E. et al. Curr Eye Res 2010; 35:1040-1041].

By conducting experiments, it was discovered that there is a minimum concentration of the cross-linking agent in the corneal stroma, ≤20 µg/ml, so that UV-A illumination does not photo-activate the agent itself. The photo-activation of the cross-linking agent in the cornea of an eye occurs by irradiation with UV-A light. The photo-chemical reaction causes riboflavin (Rf) to pass to its excited triplet state ($Rf^*_3$ indicated in FIG. 3 with the symbol "O" inside the cornea of an eye), which reacts with the corneal proteins through Type I and also Type II photochemical mechanisms generating superoxide anions ($O_2^-$) and oxygen singlets ($^1O_2$), also indicated in FIG. 3 with the symbol "*" inside the cornea of an eye, respectively. Photo-activation can be controlled by varying the physical parameters of the UV-A radiation, such as, for example, power density, irradiation time, phase and/or intensity of the irradiated beam, and its mode of irradiation, that is, continuous or pulsed. The expert in the field has the knowledge to identify the most suitable parameters.

In its excited triplet state, $Rf^*_3$, according to Type I mechanism, which is favoured by concentrations of the cross-linking agent above the minimum threshold of 20 µg/ml, riboflavin further reacts with corneal proteins to generate superoxide anions from hydrogen atoms or by electron transfer, generating additional cross-linking bonds between corneal proteins. The addition of said oxidizing agent, chosen among the mETC inhibitors, to the formulation does not interfere with Type I mechanism during the photo-activation of riboflavin-5-phosphate into the corneal stromal matrix. In Type II mechanism, the excited state of riboflavin reacts with oxygen to form singlet oxygen; in addition, singlet oxygen, whose levels are further increased in the corneal tissue thanks to the addition of said oxidizing agent in the formulation, acts to generate new, or additional, covalent chemical bonds between corneal proteins. In particular, the diffusion of said oxidizing agent into the deeper layers of the stroma improves Type II mechanism in these layers of the cornea, solving the problems of the prior art, which are caused by the low probability of generating covalent chemical bonds through Type II reactions in the deeper layers of the cornea.

The therapeutic effect obtained through the application of a mitochondrial electron transport chain inhibitor, rather than the administration of gaseous oxygen, is therefore certainly unexpected. Said therapeutic effect is due to the effective generation of singlet oxygen not only onto the corneal surface but also into the deeper layers of the corneal stroma. The singlet oxygen, generated by the administration of these inhibitors, favors Type II reactions without hindering Type I reactions with the (unexpected) effect of increasing the number of covalent chemical bonds between the stromal proteins across the posterior layers of the cornea, allowing, as an additional advantageous effect, corneal cross-linking of the whole tissue to be treated.

Actually, it has been verified that oxygen dissolved in the composition is released on the surface of the cornea without penetrating deeply, thus behaving exactly like atmospheric oxygen [Kamaev P et al. Invest Ophthalmol Vis Sci 2012, 53 (4): 2360-2367].

The formulation can be administered passively, that is, through a natural absorption by the cornea that can last up to over 30 minutes.

Devices and techniques are known to facilitate the penetration of liquid formulations into the cornea. These are based on iontophoresis, as described in WO201295877, or on the generation of vacuum, as described in US2015305930.

These methods can also be implemented to further facilitate the penetration of the liquid formulation object of the present invention into the deeper stromal layers of the cornea.

These methods, synergistically with this liquid formulation, do not require any pre-treatment of the cornea, and in particular do not need the epithelial removal.

Therefore, thanks to the present invention it is possible to use corneal cross-linking technique, which is non invasive and devoid of the common risks caused by corneal de-epithelialization, such as infection and corneal scarring, and also it allows a greater penetration of the low molecular weight oxidizing agent and the photo-sensitizing agent into the posterior layers of the corneal stroma. The penetration of the oxidizing agent enhances Type II mechanisms into the deeper layers of the cornea, without limiting Type I mechanisms, thus solving the known limits of the technique.

Figure 4:
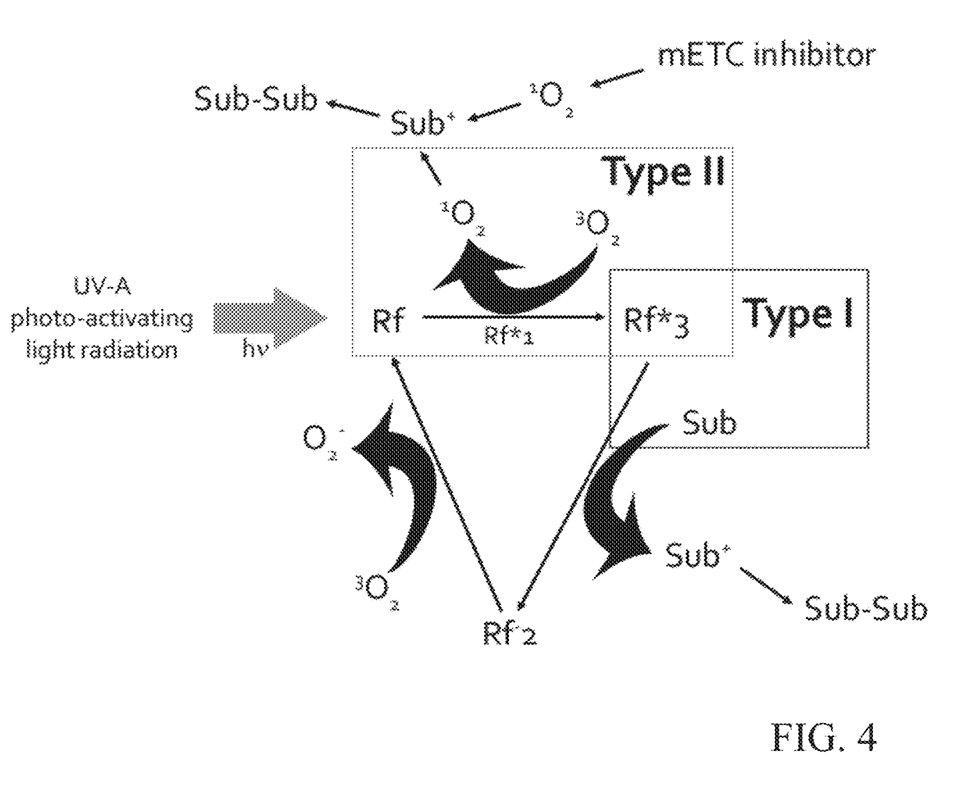
FIG. 4 describes the mechanism of generation of new, or additional, covalent chemical bonds between the stromal proteins induced by the photo-activation of the formulation object of the present invention.

FIG. 4 illustrates a sequence of photo-chemical reactions induced in the corneal stroma after applying the liquid formulation object of the present invention, in which the photo-sensitizing, or cross-linking, agent is represented, by way of example, by riboflavin-5-phosphate, while the oxidizing agent is represented, by way of example, by BRD56491 ("mETC inhibitor").

The photo-chemical reactions ultimately generate additional covalent chemical bonds (Sub-Sub) between collagen and/or proteoglycan core proteins of the corneal stroma (Sub).

The UV-A light radiation photo-activates the cross-linking agent, diffused into the corneal stroma, releasing energy $E=hn$. In turn, the cross-linking agent reacts according to the known Type I and Type II mechanisms. The two types of reactions are capable of generating a similar effect depending on the environmental conditions. For example, according to Type I mechanism, the excited triplet state of riboflavin ($Rf^*_3$) interacts with the corneal stroma proteins (the substrate, Sub) to produce a radical ($Sub^+$), usually by the homolytic cleavage of a hydrogen bond in the substrate. The Type I mechanism, in relation to the concentration of riboflavin and its UV-A photo-activation, is propagated by a chain reaction through the generation of superoxide anion ($O_2^-$). According to Type II mechanism, the excited triplet state of riboflavin ($Rf^*_3$) transfers its energy directly to triplet oxygen ($^1O_2$) to produce singlet oxygen ($^1O_2$) The singlet oxygen radical interacts with the corneal stroma proteins generating covalent chemical bonds through various reactions, such as for example the creation of double bonds or cyclo-addition.

The higher the concentration of riboflavin across the treatment area, the more the Type I mechanism is favoured. The direct increase of singlet oxygen levels ($^1O_2$) by said oxidizing agent enhances Type II mechanism, since it generates additional covalent chemical bonds between corneal proteins by direct reaction with singlet oxygen, $^1O_2$, but does not interfere with Type I mechanism that propagates through its own chain reaction.

According to a variant of the present invention, the formulation can contain the oxidizing agent alone, with one or more buffer systems, permeabilizers, antiseptics, disinfectants, and excipients, for the prevention and treatment of eye infections, either in humans or mammalians.

The present therapeutic formulation, which contains the photo-sensitizing agent and the oxidizing agent, for simplicity referred to as "set of agents", is prepared with the right balance between solubility, osmolarity, pH, and photo-stability, as already known to the expert in the field [Akers M J. Int J Pharm Compd 2016; 20:137-141].

Further agents can be contained in the formulation to facilitate its diffusion and penetration into the corneal stroma through the intact corneal epithelium. Although not recommended, a de-epithelialisation of the cornea can be done prior to the administration of the liquid formulation, in order to facilitate its penetration into the corneal stroma. It is actually preferred to add the liquid formulation with non-toxic permeabilizers, which facilitate a greater penetration of the set of agents through the intact epithelium. By way of example, the formulation object of the present invention can contain one or more permeabilizers and/or stabilizers, such as ethylendiaminetetraacetic acid (EDTA) and/or tris(hydroxymethyl)aminomethane hydrochloride (trometamol) and/or benzalkonium chloride (BAK) and/or tocopheryl-polyethylene-glycol-succinate (TPGS) and/or polyhexanide and/or ethanol and/or dimethyl sulfoxide (DMSO).

The formulation can also contain other substances, such as for example excipients, disinfectants, antiseptics, such as, by way of example and without limitation: benzyl-alcohol and/or methyl-paraben and/or povidone iodine and/or chlorhexidine and/or ozone or ozonides and/or merbromine and/or silver nitrate and/or potassium permanganate and/or hypochlorite or other active chlorine compounds as antimicrobials.

The formulation object of the present invention can also contain tonicity and/or viscosity agents, such as by way of example glucose and/or dextran and/or mannitol, and/or polymers, such as hydroxypropyl methylcellulose and/or carboxymethylcellulose and/or polyethylene glycol to increase the bioavailability of the set of agents onto the corneal surface.

The formulation may consist of an aqueous solution or a suspension or any other aqueous medium and can include one of the following sterile diluting means, such as distilled water, pure water, saline solution (preferably physiological solution), Ringer solution, isotonic sodium chloride solution.

The formulation can also consist of an amphoteric solution, which contains hydrophilic and hydrophobic (lipophilic) elements in a balanced way.

The formulation may contain buffer systems, such as neutral buffered saline, phosphate saline buffer, acetate, citrate, and equivalent buffer systems. In general, it is known to those skilled in the art that the pH of the formulation promotes and maintains stability, understood as negligible photo-degradation or photo-lysis of the photo-sensitizing agent [Frost D V. J Biol Chem 1942; 145:693-702] and in particular, it is preferable that the pH is between 6.6 and 7.4. The presence of EDTA, preferably at concentrations between 0.05% and 0.25% m/m, and/or trometamine, preferably at concentrations between 0.05% and 0.30% m/m, and/or other stabilizing agent can ensure that the formulation is suitably buffered to maintain the pH value in the 6.6 and 7.4 range and also, as known to an expert technician, to stabilize the solution containing the photo-sensitizing agent reducing the risk of photo-lysis. The density of the formulation object of the present invention at room temperature is about 1.0 g/cm$^3$, so that, with reference to the composition of said formulation, the terms "% m/m" and "% m/v" are equivalent.

Preferably, the formulation is hypotonic, since [Kissner A et al. Curr Eye Res 2010; 35:715-721], hypotonicity promotes the penetration of riboflavin-5-phosphate into the corneal stroma through the intact epithelium. The osmolarity of the formulation is regulated by the most appropriate addition of salts or other agents to maintain its value in a range between 60 mOsm/Kg and 120 mOsm/Kg. The osmolarity of the liquid formulation is measured, and accordingly adjusted if necessary, using an osmometer, as known to the person skilled in the art.

The formulation to be applied to the cornea of an eye must be sterile. The sterilization of the formulation can be carried out according to the methods and techniques known to those skilled in the art, such as, for example and not limited to, sterilization by filtration, sterilization by vaporization and/or controlled pressure, autoclaving, irradiation etc. In any case, the sterilization methods cannot critically deteriorate the photo-sensitizing agent and/or the oxidizing agent.

The sterile formulation is administered topically onto the cornea of an eye; the formulation can be contained in an appropriate container, such as by way of example, a bottle, a vial or a syringe, either of plastic or glass material. The container of the formulation is, in any case, disposable and the components of the vial and/or syringe and their containers are sterilized, for example, with chemical (e.g. ethylene oxide) or physical methods.

The vial, the bottle, or the syringe, containing the formulation, can be contained in a sterile envelope or in a double sterile envelope.

The sterile formulation is prepared in the technical form of eye drops, which can be administered by applying eye drops directly onto the cornea, whether with intact epithelium or not, or it can be administered through the use of applicators or active methods, such as, as described above, by way of example, corneal iontophoresis or vacuum pump.

Furthermore, it is possible to mask portions of the corneal surface in order to obtain a deliberately uneven distribution of the liquid formulation across the treatment area of the cornea of an eye, especially for the indication of use of correcting visual disorders.

The pharmaceutical composition of the present liquid formulation, the consequent administration and photo-activation into the cornea by UV-A light radiation finds particular application for the treatment of some ocular disorders, such as the degenerative pathologies of the ocular tissues, including the cornea and/or the sclera, such as keratoconus or iatrogenic corneal ectasia, as well as the visual disorders, such as myopia, hyperopia, astigmatism and presbyopia, and for the prevention and treatment of infectious diseases of the ocular surface, such as keratitis and septic corneal ulcers. Keratoconus and secondary corneal ectasia, likely induced by eye surgery, are the most frequent degenerative diseases of the cornea. Corneal infections can be caused by bacteria, viruses, fungi, chlamydiae, protozoa, parasites. Visual disorders can be induced by an altered corneal curvature or by an abnormal axial length of the eye and/or by a reduction of the focal power of the eye for far and/or for near and include myopia, hyperopia, astigmatism and presbyopia.

The therapeutic formulation described in the present invention solves the limits of the prior art, in that it has a pharmaceutical composition containing a cross-linking agent, such as for example riboflavin-5-phosphate, and an oxidizing agent, such as for example BRD56491, which inhibits the mitochondrial electron transport chain, to increase the levels of singlet oxygen directly into the deeper layers of the corneal stroma significantly more than a formulation that contains riboflavin-5-phosphate alone and is devoid of BRD56491, or any other agent of mETC inhibitors. The liquid formulation thus obtained can be applied directly onto a cornea with intact epithelium or onto a cornea that has an abrasion or ulcerative lesion, such as during an infection or degeneration, as an eye drop to be photo-activated, or not, by UV-A light radiation.

There are possible embodiment variants to the non-limiting example described, however, without departing from the scope of protection of the present invention, including all equivalent realizations for a person skilled in the art, to the content of the claims.

From the above description, the person skilled in the art is able to realize the object of the invention without having to introduce further details.

The following examples are provided as an illustration of the invention and are not to be considered limitative of the relative scope.

EXAMPLES

Examples of preparation of a liquid formulation according to the present invention (FIG. 5) with the composition of all the components indicated in detail:

Example 1

| Description | CAS Number | Composition |
|---|---|---|
| Riboflavin sodium phosphate | 130-40-5 | 0.30% (equivalent to 3 mg/ml) |
| BRD56491 | 14756-26-4 | 0.01% (equivalent to 1 µg/ml) |
| Disodium Hydrogen Phosphate (Na$_2$HPO4 2H$_2$O) | 10028-24-7 | 0.054% |
| Sodium Dihydrogen Phosphate (NaH$_2$PO4 2H$_2$O) | 13472-35-0 | 0.023% |
| Sodium EDTA | 6381-92-6 | 0.10% |
| TRIS | 77-86-1 | 0.05% |
| Sodium chloride | 7647-14-5 | 0.23% q.b. (at 100 mOsm/kg) |
| DMSO | 67-68-5 | 0.04% |
| Water for injection | | q.b. (at 100 ml) |
| Osmolality | | 100 mOsmol/Kg |
| Relative density | | 1.0040 g/cm$^3$ |
| pH | | 7.00 |

Example 2

| Description | CAS Number | Composition |
|---|---|---|
| Riboflavin sodium phosphate | 130-40-5 | 0.30% (equivalent to 3 mg/ml) |
| BRD56491 | 14756-26-4 | 0.03% (equivalent to 3 µg/ml) |
| Disodium Hydrogen Phosphate (Na$_2$HPO4 2H$_2$O) | 10028-24-7 | 0.054% |
| Sodium Dihydrogen Phosphate (NaH$_2$PO4 2H$_2$O) | 13472-35-0 | 0.023% |
| Sodium EDTA | 6381-92-6 | 0.10% |
| TRIS | 77-86-1 | 0.05% |
| Sodium chloride | 7647-14-5 | 0.23% q.b. (at 100 mOsm/kg) |
| DMSO | 67-68-5 | 0.09% |
| Water for injection | | q.b. (at 100 ml) |
| Osmolality | | 100 mOsmol/Kg |
| Relative density | | 1.0040 g/cm$^3$ |
| pH | | 7.00 |

Example 3

Figure 5:
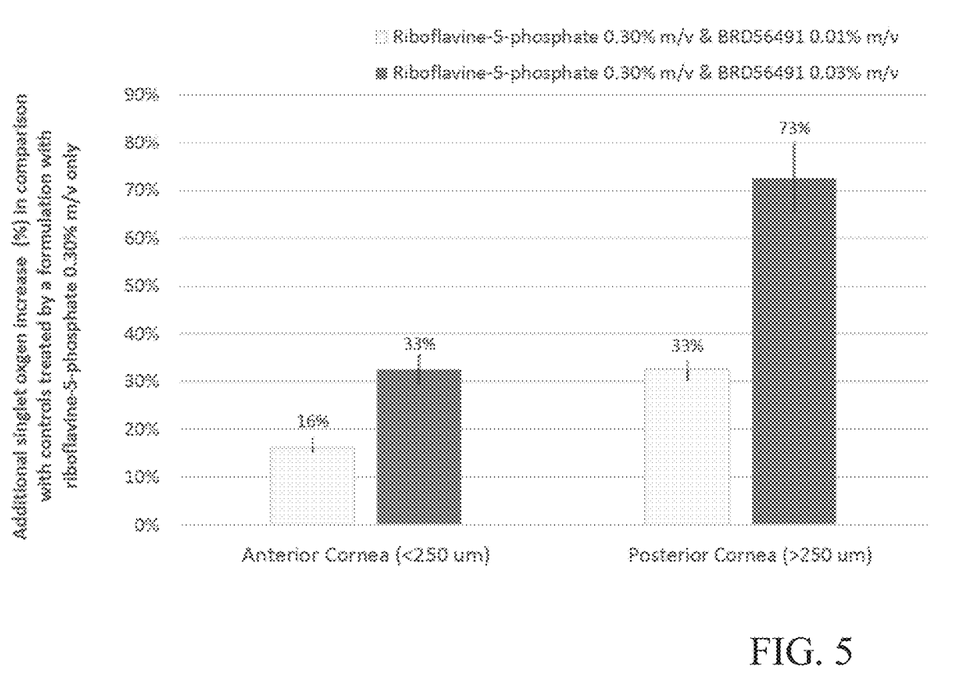
FIG. 5 shows the histograms demonstrating the increase, in percentage, of singlet oxygen in corneal tissues treated by corneal cross-linking using different formulations.

The liquid formulations of examples 1 and 2 have been used to perform experiments on donor eye bank human corneal tissues, provided by the Veneto eye bank foundation and not suitable for transplantation, whose results regarding the additional increase of ROS levels, preferably oxygen singlets, into the corneal stroma, preferably the posterior stroma, in comparison with a liquid formulation comprising only a photo-sensitizing agent, riboflavin-5-phosphate 0.30% m/v, are illustrated in FIG. 5.

The liquid formulation of said example 1 comprises riboflavin-5-phosphate 0.30% m/v and BRD56491 0.01% m/v.

The liquid formulation of said example 2 comprises riboflavin-5-phosphate 0.30% m/v and BRD56491 0.03% m/v.

The liquid formulation used for comparison comprises riboflavin-5-phosphate 0.30% m/v without oxidizing agent.

The scope of a first experiment was to dose the concentration of BRD56491 into the corneal stroma for both said formulations of examples 1 and 2. Four eye bank human donor corneal tissues (codes 185526, 185387, 185488 and 185489), of which two treated by each of said liquid formulations, which have been applied for 15 minutes onto the cornea with intact epithelium, were used for this purpose. For comparison, two eye bank human donor corneal tissues (codes 185426 and 185434) were treated with a liquid formulation comprising riboflavin-5-phosphate without oxidizing agent, which has been applied for 15 minutes onto the cornea with intact epithelium. After the epithelial removal using an Amoils' brush (Innovative Excimer Solutions Inc., USA) and the appropriate tissue processing according to the techniques known to the skilled in the art to obtain the supernatant [Baiocchi et al. J Cataract Refract Surg 2009; 35:893-899], the doses of BRD56491 in said supernatants of corneal stroma have been measured using a liquid chromatography-mass spectrometry device. The average doses of BRD56491 measured in the corneal tissues treated with said examples 1 and 2 of liquid formulation were about 1 μg/ml and 3 μg/ml respectively, as expected based to the incremental concentration of BRD56491 in the two formulations of examples 1 and 2 and the low molecular weight of the oxidizing agent that allows its rapid diffusion into the corneal stroma even in the presence of intact epithelium.

The scope of a latter experiment was to quantify the increase of reactive oxygen species (ROS), preferably oxygen singlets, generated by said liquid formulations during corneal cross-linking treatments of eye bank human donor corneal tissues. Four human donor corneal tissues (codes 184531, 184773, 185490 e 185551) were treated as follows: each of said liquid formulations, of example 1 and 2, has been applied for 15 minutes onto the cornea with intact epithelium and immediately after the application of said liquid formulation, each tissue has been irradiated with UV-A light. For comparison, two human donor corneal tissues (codes 183736 e 183932), were treated using a liquid formulation comprising riboflavin-5-phosphate without oxidizing agent, which has been applied for 15 minutes onto the cornea with intact epithelium; immediately after the application of said liquid formulation, each corneal tissue has been irradiated with UV-A light.

At the end of treatment, each corneal tissue has been cut using a microkeratome (Moria, France) into two lenticules, such as an anterior stromal lenticule (up to 250 mm depth) including the epithelial surface, and a posterior lenticule (from 250 mm depth to the corneal endothelium), which after appropriate processing to obtain the supernatant, have been used for measuring the levels of oxygen singlets using a spectrofluorometer and specific fluorescent probes (Singlet Oxygen Sensor Green, Molecular Probes, Inc., USA), whose fluorescence emission intensity signal (peak)=525 nm), when irradiated by blue light (peak $\lambda$=490 nm), is correlated with the levels of ROS, in particular oxygen singlets, in the supernatant. FIG. 5 shows the increase, in percentage, of singlet oxygen levels in corneal tissues treated by using two different liquid formulations comprising a photo-sensitizing agent and oxidizing agent, in comparison with a formulation comprising the photo-sensitizing agent only, or riboflavin-5-phosphate. A first example of formulation (example 1), comprises riboflavin-5-phosphate 0.30% m/v and BRD56491 0.01% m/v and a latter example of formulation (example 2) comprises riboflavin-5-phosphate 0.30% m/v and BRD56491 0.03% m/v. The formulations with riboflavin-5-phosphate 0.30% m/v with added said oxidizing agent at concentrations of 0.01% m/v and 0.03% m/v have shown an additional increase of singlet oxygen levels into the corneal stroma of +24±6% and +53±10% respectively in comparison with the formulation comprising only riboflavin-5-phosphate 0.30% m/v. Said increase of oxygen singlets has been mainly found into the posterior stromal layers, which are deeper than 250 micrometers. Actually, for said examples 1 and 2 of the liquid formulation, the additional increase of oxygen singlets was on average +16% and +33% respectively greater than the formulation comprising only riboflavin-5-phosphate across the anterior corneal stroma, between 0 and 250 micrometers depth (in FIG. 5 anterior cornea <250 um) and on average +33% and +73% respectively greater than said formulation comprising only riboflavin-5-phosphate across the posterior corneal stroma, deeper than 250 micrometers (in FIG. 5 anterior cornea >250 um).

As described above, the average dose of BRD56491 found in the corneal tissues treated by using said examples 1 and 2 of said liquid formulation were about 1 μg/ml and 3 ng/ml respectively. It is clear that the higher the concentration of the oxidizing agent, preferably BRD56491, in the formulation, the greater the percentage increase of ROS, preferably singlet oxygen, into the corneal stroma, in particular across the deeper stromal layers. Consequently, the higher the singlet oxygen concentration, the greater the number of Type II reactions, which in turn trigger the generation of a higher number of new covalent chemical bonds in the substrate. It is thus evident that, by increasing the number of new covalent chemical bonds across the anterior and posterior corneal stroma, the corneal tissue achieves better biomechanical stiffening, which is necessary to make the treatment of eye disorders, including corneal degenerations, corneal infections and visual disorders, both for humans and mammalians, clinically effective. This implies that the corneal cross-linking treatment performed with said formulation containing a photo-sensitizing agent and an oxidizing agent of the mETC inhibitors family, shows greater clinical efficacy than a formulation without said oxidizing agent.

What is claimed is:

1. A pharmaceutical composition for an ophthalmic use either in humans or mammalians, comprising
    an effective amount of an oxidizing agent, wherein the oxidizing agent is a mitochondrial electron transport chain (mETC) inhibitor and partially or totally inhibits mitochondrial electron transport chain activity;

an effective amount of a photo-sensitizing agent, wherein the photo-sensitizing agent is a molecule having an absorbance peak in a wavelength range between 340 nm and 440 nm and emits fluorescence in a wavelength range between 450 nm and 600 nm; and one or more pharmaceutically acceptable excipients; wherein the pharmaceutical composition is a liquid formulation.

2. The pharmaceutical composition according to claim 1, wherein a concentration of the oxidizing agent in the liquid formulation is between 0.1 µg/ml and 100 µg/ml.

3. The pharmaceutical composition according to claim 1, wherein a concentration of the photo-sensitizing agent in the liquid formulation is between 0.01 mg/ml and 5.0 mg/ml.

4. The pharmaceutical composition according to claim 1, wherein the photo-sensitizing agent is one or more selected from the group consisting of riboflavin, riboflavin-5-phosphate, fluorescein, coumarin, bengal rose, acridine yellow, and quinidine yellow.

5. The pharmaceutical composition according to claim 1, wherein the oxidizing agent is non-toxic for the humans or the mammalians, and the oxidizing agent is one or more selected from the group consisting of adaphostin, alpha-tocopherol succinate, amobarbital, antimycin A, atpenin A5, benzyl isothiocyanate, carboxine, ciantraniliprole, deguelin, doxorubicin, fenretinide, HQNO, IACS-010759, lamellarin D, malonate, metformin, MPP+, MK-077, nitric oxide, nitropropionic acid, N-retinylidene-N-retinylethanolamine, oligomycin, phenformin hydrochloride, piceatannol, piericidin A, PM031379, porfimer sodium, resveratrol, rhein, rhodamine 123, rotenone, sodium azide, tamoxifen, TTFA, 3BP, 3-ter-butylated-4-hydroxyanisole, DIM, troglitazon, VLX600, xanthomumol, BRD56491, BRD5459, and BRD9092.

6. The pharmaceutical composition according to claim 1, wherein the one or more pharmaceutically acceptable excipients comprise at least one of:

permeabilizers and/or stabilizers, wherein the permeabilizers and/or the stabilizers are selected from the group consisting of ethylenediaminetetraacetic acid (EDTA), tris(hydroxymethyl)aminomethane hydrochloride (trometamol), benzalkonium chloride (BAK), tocopheryl-polyethylene-glycol-succinate (TPGS), polyhexanide, ethanol, and dimethyl sulfoxide (DMSO);

disinfectants and/or antiseptics, wherein the disinfectants and/or antiseptics are antimicrobial chlorine compounds selected from the group consisting of benzyl alcohol, methyl paraben, povidone-iodine, chlorhexidine, ozone, ozonures, merbromine, silver nitrate, potassium permanganate, and hypochlorite; and/or agents of tonicity and/or viscosity, wherein the agents of the tonicity and/or the viscosity are selected from the group consisting of glucose, dextran, mannitol, hydroxypropylmeticellulose, carboxymethylcellulose, and polyethylene glycol.

7. The pharmaceutical composition according to claim 1, wherein the pharmaceutical composition is an aqueous solution or a suspension, and the pharmaceutical composition further comprises sterile diluting agents selected from the group consisting of a distilled water, a purified water, a saline solution, a physiological solution, a Ringer solution, an isotonic sodium chloride solution.

8. The pharmaceutical composition according to claim 1, further comprising a buffer system, wherein the buffer system is selected from the group consisting of a neutral saline buffer, a phosphate buffer, an acetate, a citrate, and equivalent buffer systems.

9. The pharmaceutical composition according to claim 1, wherein the pharmaceutical composition is hypotonic.

10. The pharmaceutical composition according to claim 1, wherein the pharmaceutical composition is a formulation administered topically onto a cornea of an eye.

11. The pharmaceutical composition according to claim 1, wherein the pharmaceutical composition is used in a treatment of ocular disorders, wherein the ocular disorders are degenerative diseases of ocular tissues, comprising a cornea and/or a sclera, wherein the degenerative diseases of the ocular tissues are keratoconus, corneal ectasias comprising iatrogenic corneal ectasia, eventually induced by an eye surgery;

a treatment of visual disorders caused by an altered corneal curvature or an abnormal axial length of an eye and/or a decreased focal power of the eye for distance and/or for near, wherein the visual disorders are myopia, hyperopia, astigmatism and presbyopia; and for a prevention and a treatment of infectious diseases of an ocular surface caused by bacteria, viruses, fungi, chlamydiae, protozoa, parasites, wherein the infectious diseases are keratitis and septic corneal ulcers.

12. A packaging, comprising the pharmaceutical composition according to claim 1 contained in a container, wherein the container is one selected from the group consisting of: a bottle, a vial, a plastic syringe, a glass syringe, a disposable container, wherein the container is configured to be packaged in a sterile envelope or in a double sterile envelope.

13. A method for promoting a generation of Type II chemical bonds without inhibiting Type I bonds through a direct increase of a singlet oxygen by administering the pharmaceutical composition according to claim 1 onto a cornea of a human or mammalian.

14. The method according to claim 13, wherein a concentration of the oxidizing agent that penetrates into a corneal stroma is between 2 µmol/l and 15 µmol/l.

15. The method according to claim 13, wherein a concentration of the photo-sensitizing agent that penetrates into a corneal stroma is at least 20 µg/ml.

* * * * *